US008920295B2

(12) United States Patent
Zeng et al.

(10) Patent No.: US 8,920,295 B2
(45) Date of Patent: Dec. 30, 2014

(54) CUTTER-CHANGING DEVICE

(75) Inventors: Xian-Cai Zeng, Shenzhen (CN);
Dong-Cheng Liu, Shenzhen (CN);
Chin-Tsan Huang, New Taipei (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 379 days.

(21) Appl. No.: 13/420,614

(22) Filed: Mar. 15, 2012

(65) Prior Publication Data
US 2013/0085051 A1    Apr. 4, 2013

(30) Foreign Application Priority Data
Sep. 30, 2011   (CN) .......................... 2011 1 0297219

(51) Int. Cl.
*B23Q 3/157*   (2006.01)
*B23Q 3/155*   (2006.01)
*B23B 31/22*   (2006.01)

(52) U.S. Cl.
CPC ............ *B23Q 3/15526* (2013.01); *B23B 31/22* (2013.01); *Y10S 483/902* (2013.01); *B23Q 3/1554* (2013.01); *B23Q 3/15766* (2013.01)
USPC .................... 483/44; 483/38; 483/39; 279/75; 483/902

(58) Field of Classification Search
CPC ............... B23Q 3/1552; B23Q 3/1554; B23Q 3/15713; B23Q 3/15766; B23Q 3/1572; B23B 31/22; B25J 15/0416
USPC ........... 483/38, 39, 40, 41, 44, 45, 48, 49, 52, 483/56, 57, 66, 67, 902; 294/86.3; 279/4.04, 4.12, 74, 75; 74/813 R, 816, 74/817
See application file for complete search history.

(56) References Cited

U.S. PATENT DOCUMENTS

| 5,620,406 | A | * | 4/1997 | Bae ................................. 483/39 |
| 5,624,365 | A | * | 4/1997 | Haninger et al. .............. 483/50 |
| 5,906,378 | A | * | 5/1999 | Nordquist .................... 279/4.06 |
| 5,909,882 | A | * | 6/1999 | Schill ........................... 279/4.04 |
| 6,857,995 | B2 | * | 2/2005 | Maeda ........................... 483/41 |
| 7,604,584 | B1 | * | 10/2009 | Wu et al. ........................ 483/44 |
| 2010/0173762 | A1 | * | 7/2010 | Tullmann et al. .............. 483/67 |

FOREIGN PATENT DOCUMENTS

| CN | 2400217 Y | 10/2000 | |
| JP | 61044546 A | * 3/1986 | ............. B23Q 3/157 |

* cited by examiner

*Primary Examiner* — Erica E Cadugan
*Assistant Examiner* — Michael Vitale
(74) *Attorney, Agent, or Firm* — Novak Druce Connolly Bove + Quigg LLP

(57) ABSTRACT

A cutter-changing device includes a cutter-magazine carrying cutters, a rotary telescopic cylinder, and a clamping sub-assembly. The clamping sub-assembly includes a cutter-changing arm, and a pair of clamping assemblies. The rotary telescopic cylinder drives the cutter-changing arm to rotate, extend and retract. Each clamping assembly includes a mounting member, an elastic member, a piston, and at least one resisting member. The mounting member is mounted on the cutter-changing arm, and defines at least one mounting hole through the sidewall thereof. The elastic member and the piston are sleeved with the mounting member, and the two opposite ends of the elastic member press against the piston and the mounting member. The resisting member is mounted between the elastic member and the mounting member, and capable of being resisted by the piston to be partially exposed from the mounting hole.

18 Claims, 6 Drawing Sheets

CUTTER-CHANGING DEVICE

BACKGROUND

1. Technical Field

The present disclosure relates to cutter-changing devices, particularly to a cutter-changing device for clamping cutters precisely.

2. Description of Related Art

A cutter-changing device may include a cutter-magazine carrying a plurality of cutters, a clamping assembly, and a rotary telescopic cylinder. The rotary telescopic cylinder drives the clamping assembly to clamp a cutter from the cutter-magazine and to insert the cutter in a machining device. However, during clamping of the cutter, gaps between the clamping assembly and the cutter may be present if the clamping assembly is worn or of low precision. The clamping assembly may not tightly clamp the cutter, which is potentially dangerous, and a lower clamping precision of the cutter-changing device may lead to erroneous or low quality machining.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
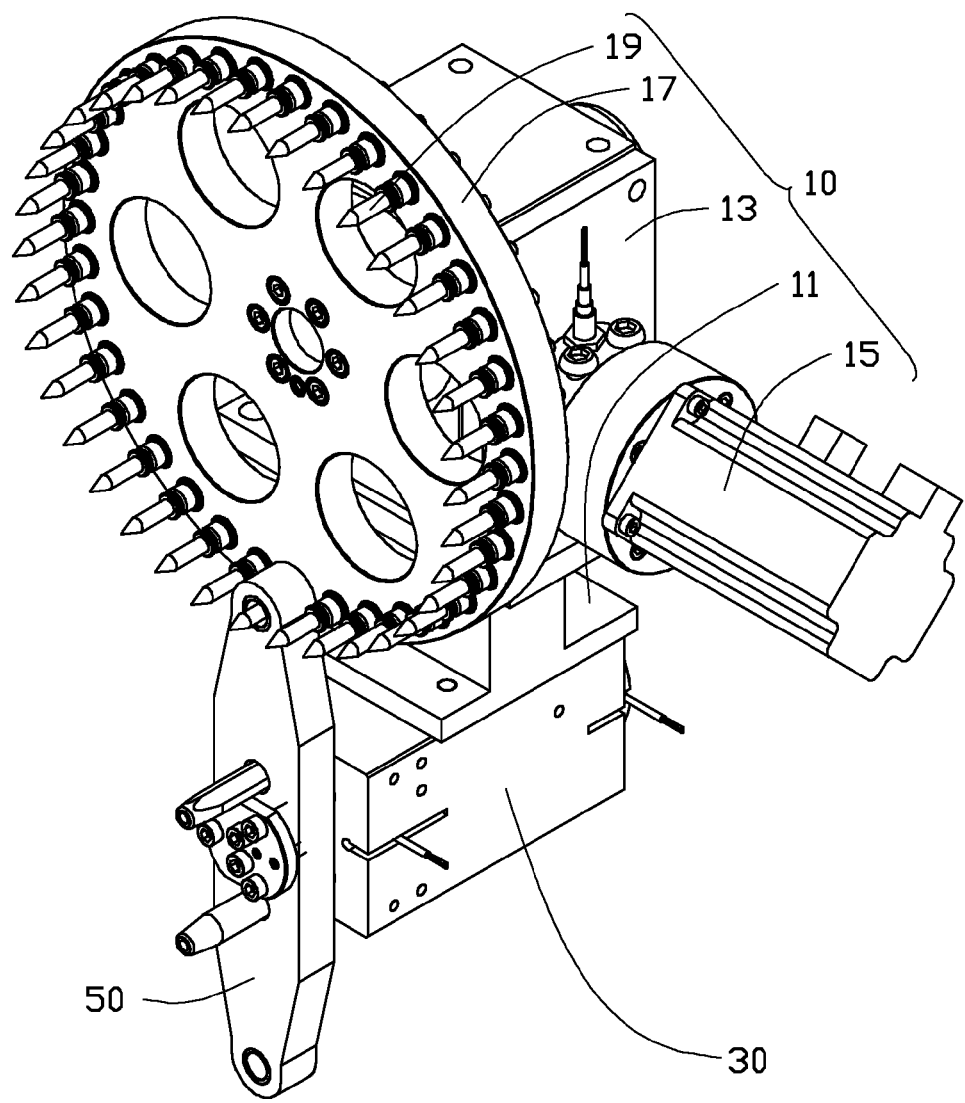
FIG. 1 is an isometric view of an embodiment of a cutter-changing device including a clamping sub-assembly, and a rotary telescopic cylinder.
Figure 2:
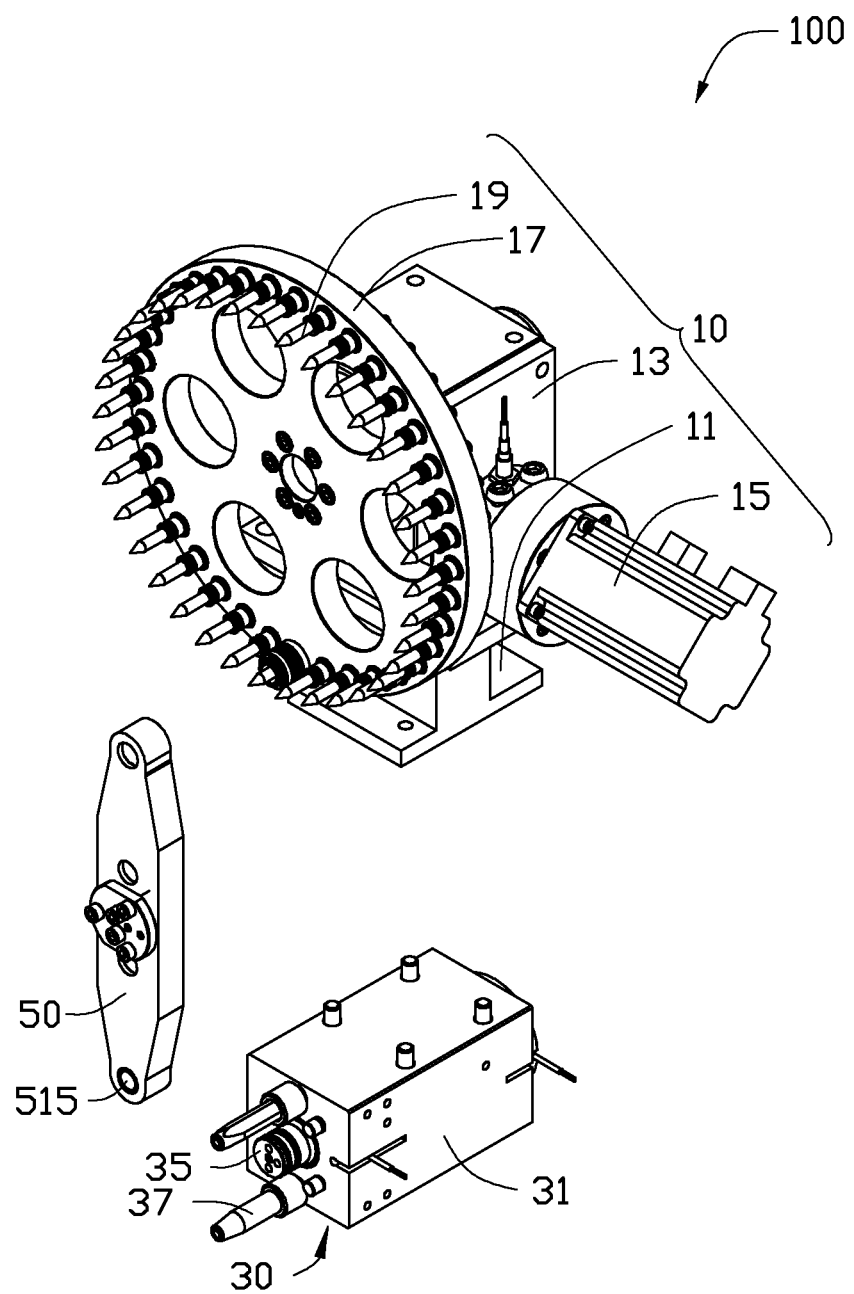
FIG. 2 is an exploded, isometric view of the cutter-changing device shown in FIG. 1.

Referring to FIGS. 1 and 2, an embodiment of a cutter-changing device 100 includes a cutter-magazine 10, a rotary telescopic cylinder 30, and a clamping subassembly 50. The cutter-magazine 10 is mounted on top of the rotary telescopic cylinder 30. The clamping sub-assembly 50 is mounted on an end of the rotary telescopic cylinder 30, and is driven by the rotary telescopic cylinder 30 to rotate about a central axis of the rotary telescopic cylinder 30, extend away from the rotary telescopic cylinder 30 and retract towards the rotary telescopic cylinder 30.

The cutter-magazine 10 includes a base 11, a cam indexer 13, a driving member 15, a tool holding pan 17 and a plurality of cutters 19. The cam indexer 13 is fixed on the base 11. The tool holding pan 17 is mounted on a side of the cam indexer 13. The driving member 15 connects with another side of the cam indexer 13 adjacent to the tool holding pan 17, to drive the tool holding pan 17 to rotate a certain number of degrees via the cam indexer 13. The cutters 19 are spaced around the circumference of the tool holding pan 17.

The bottom surface of the base 11 is fixed to the rotary telescopic cylinder 30, and the top surface of the base 11 supports the cam indexer 13. The tool holding pan 17 is substantially a rotatable disk, and defines a plurality of mounting holes around the circumference (not shown), for mounting the cutters 19. In the illustrated embodiment, the driving member 15 and the tool holding pan 17 are each mounted on the cam indexer 13, and the tool holding pan 17 is at the same side as the clamping sub-assembly 50 so as to be able to interact with it.

Figure 4:
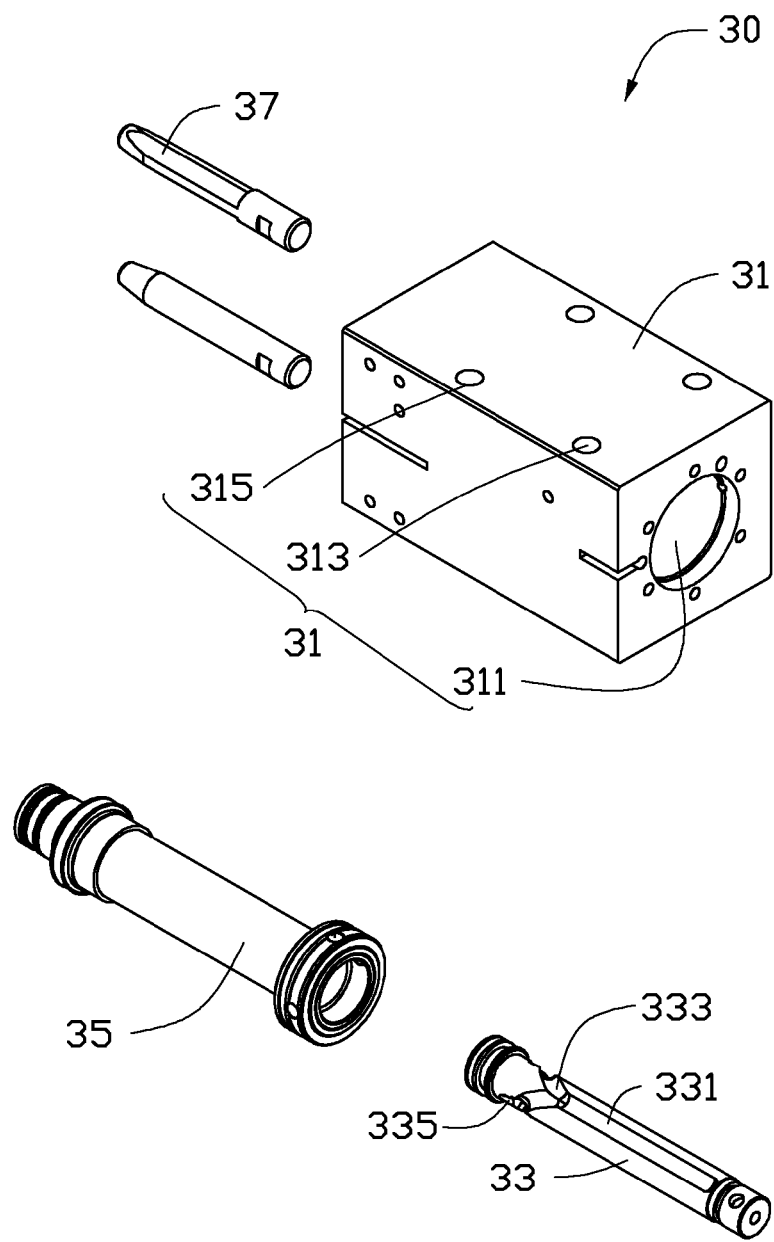
FIG. 4 is an enlarged, exploded isometric view of the rotary telescopic cylinder shown in FIG. 1.

Referring to FIG. 4, the rotary telescopic cylinder 30 includes a cylinder body 31, a guiding member 33, a piston member 35, and a pair of guiding rods 37. The guiding member 33 is fixed in the cylinder body 31. The piston member 35 is sleeved on the guiding member 33, and slidably mounted in the cylinder body 31. The cylinder body 31 is substantially rectangular in profile, and defines a receiving chamber 311 along the central axis thereof, for receiving the guiding member 33 and the piston member 35. The cylinder body 31 defines a first through hole 313 and a second through hole 315 at a sidewall of the cylinder body 31 communicating with the receiving chamber 311. The first through hole 313 and the second through hole 315 connect with a compressed air source (not shown), to supply air to the cylinder body 31.

The guiding member 33 is substantially a rod in shape, and is received in the receiving chamber 311, and an end of the guiding member 33 is fixed on the end surface of the cylinder body 31 adjacent to the clamping sub-assembly 50. The guiding member 33 defines a pair of sliding grooves 331, two pairs of rotating grooves 333, and a pair of positioning grooves 335 at the sidewall thereof. The sliding grooves 331 allow the piston member 35 to slide along the guiding member 33 in a straight line. Each rotating groove 333 extends from an end of a sliding groove 331 near the clamping sub-assembly 50 towards the clamping sub-assembly 50 along the circumference of the guiding member 33, and interconnects one sliding groove 331 and one positioning groove 335 at certain angles, to allow the piston member 35 to slide around the circumference of the guiding member 33 to rotate. The piston member 35 rotates 90 degrees when sliding along each sliding groove 331. Each positioning groove 335 connects the ends of two adjacent rotating grooves 333 away from the sliding grooves 331, for positioning the guiding member 33.

The piston member 35 is substantially a hollow tube, and is received in the receiving chamber 311. The piston member 35 is sleeved on the guiding member 33, and slidable along the sliding groove 331, the rotating groove 333, and the positioning groove 335 by the force of the compressed air, to achieve rotation, extension and retraction. The guiding rods 37 are perpendicularly mounted on an end surface of the cylinder body 31 facing the clamping sub-assembly 50 parallel to each other. The guiding rods 37 are engaged with the clamping sub-assembly 50.

Figure 3:
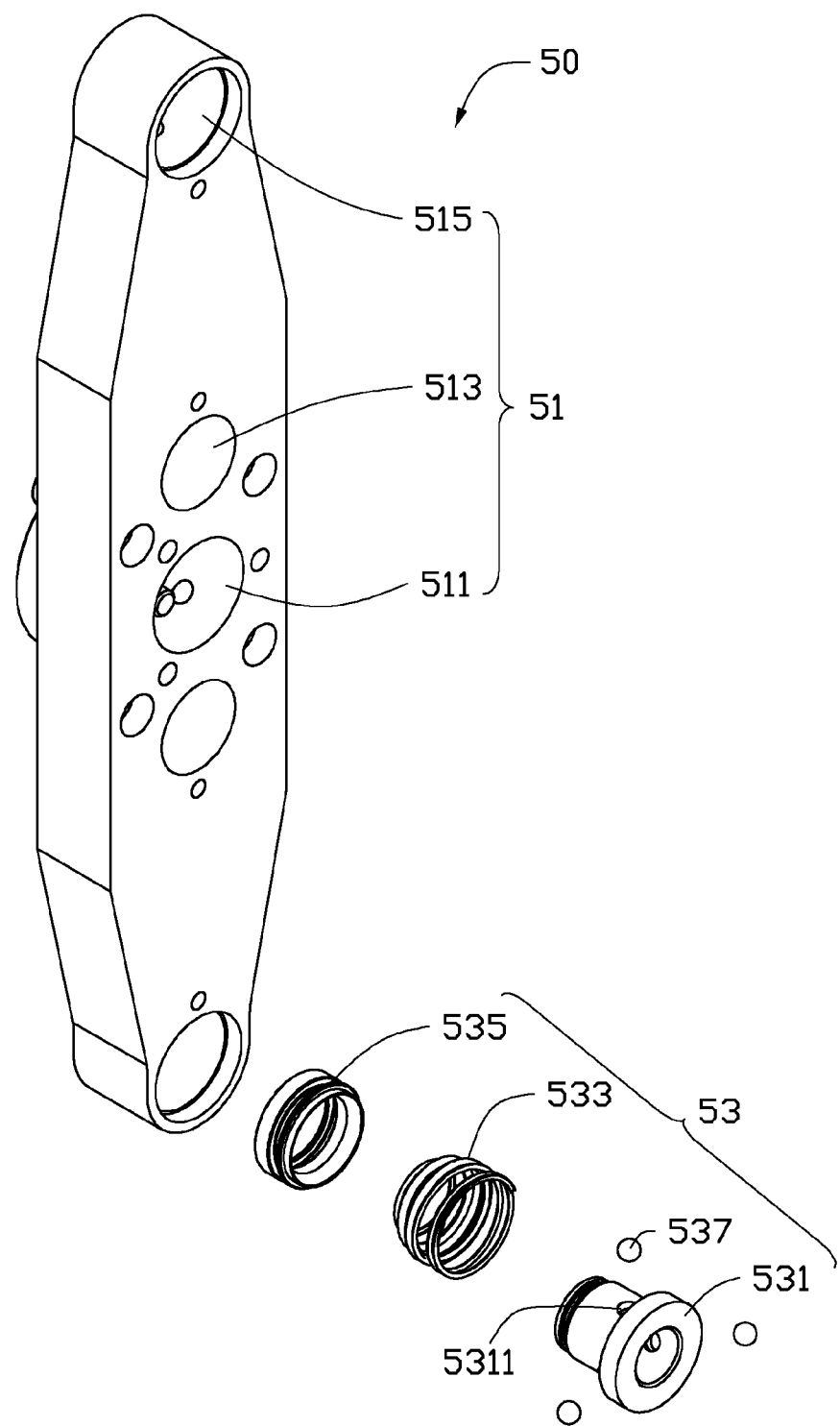
FIG. 3 is an enlarged, exploded isometric view of the clamping sub-assembly including a cutter-changing arm shown in FIG. 1.
Figure 5:
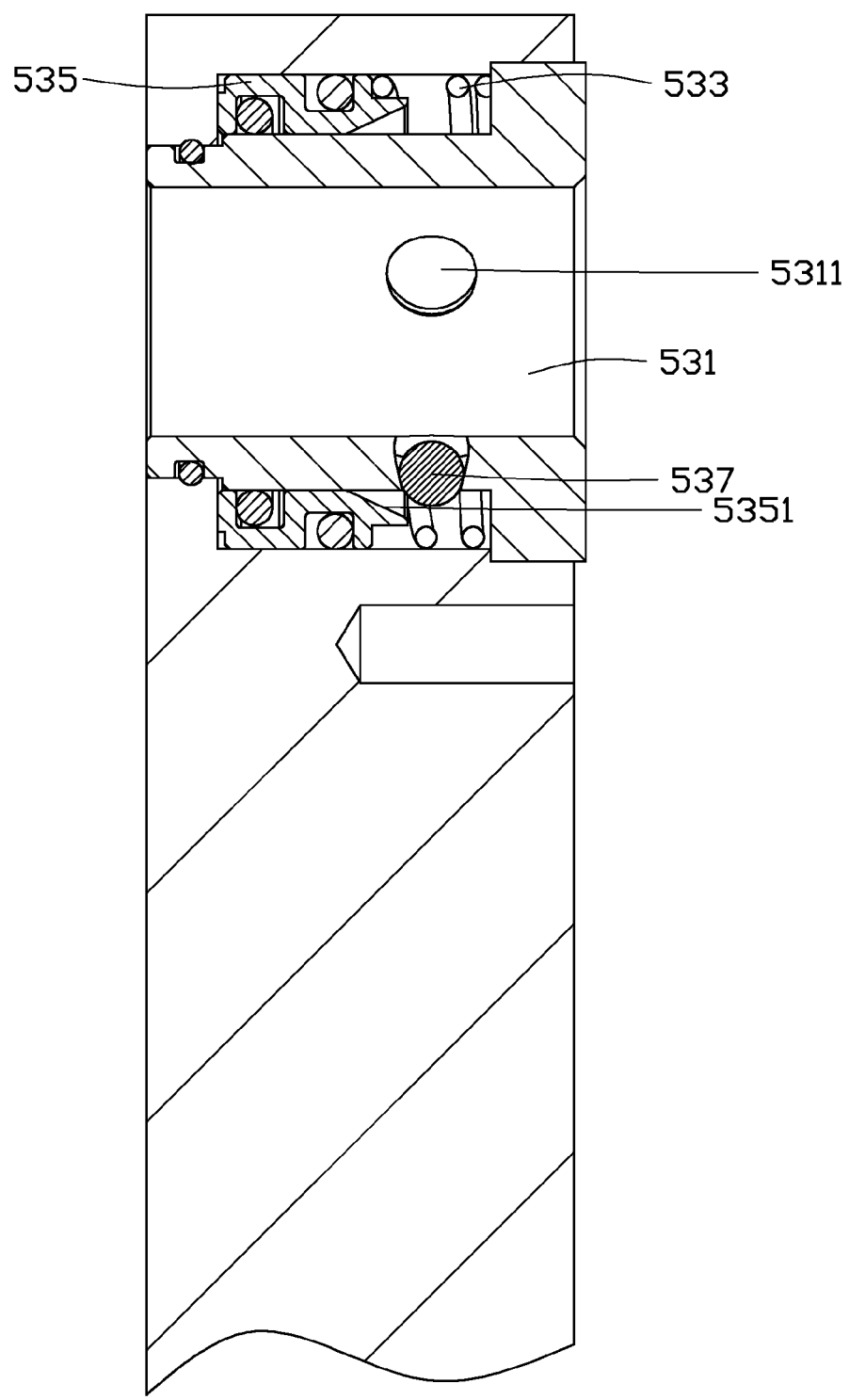
FIG. 5 is an enlarged, partial, cross-sectional view of the cutter-changing arm shown in FIG. 3.

Referring to the FIGS. 3 and 5, the clamping sub-assembly 50 is mounted on an distal end of the piston member 35 and allows the guiding rods 37 to pass through. The clamping sub-assembly 50 includes a cutter-changing arm 51, and a clamping assembly 53 mounted on each of the two opposite ends of the cutter-changing arm 51. The cutter-changing arm 51 is substantially a rectangular bar, and defines a central fixing hole 511 through the sidewalls aligned with the piston member 35. The cutter-changing arm 51 also defines two positioning holes 513 at radially equal locations, around the central fixing hole 511, and through the sidewalls aligned with the guiding rods 37. A clamping hole 515 is defined at each of the two ends of the cutter-changing arm 51, through the sidewalls of the cutter-changing arm 51, for mounting the clamping assemblies 53. The piston member 35 passes through the central fixing hole 511, and engages with the cutter-changing arm 51. The guiding rods 37 pass through the positioning holes 513, to allow the guiding rods 37 to drive the cutter-changing arm 51 to move. The sidewall of each clamping hole 515 defines a through hole (not shown), accessible to the compressed air source (not shown), to provide compressed air to the clamping assembly 53 mounted in the clamping hole 515 for clamping the cutters 19.

A clamping assembly 53 is mounted in each of the clamping holes 515. Each clamping assembly 53 includes a mounting member 531, an elastic member 533, a piston 535, and at least one resisting member 537. The mounting member 531 is mounted in the clamping hole 515. The mounting member 531 is substantially a hollow cylinder, and defines at least one mounting hole 5311 at the sidewall thereof corresponding to the resisting member 537. The piston 535 is sleeved on the mounting member 531 near the through hole. The elastic member 533 is sleeved on the mounting member 531, and one of the opposite ends of the elastic member 533 resists the mounting member 531 and another one of the opposite ends of the elastic member 533 resists the piston 535. The resisting member 537 is movably mounted between the mounting member 531 and the elastic member 533, and the resisting members 537 are partially received in the mounting holes 5311. The piston 535 forms a resisting surface 5351 at the inner surface near the resisting member 537, and the resisting surface 5351 resists the resisting member 537 to be partially exposed from the mounting hole 5311 away from the elastic member 533, driven by the compressed air. In the illustrated embodiment, the elastic member 533 is a coil spring. The resisting members 537 are steel balls. There are three resisting members 537 and three corresponding mounting holes 5311.

In assembly, first, the cam indexer 13 is fixed on the base 11, and the tool holding pan 17 and the driving member 15 are mounted on the sidewalls of the cam indexer 13. Second, the piston member 35 is movably sleeved on the guiding member 33, and received in the receiving chamber 311. The guiding member 33 is fixed to the cylinder body 31. Third, the guiding rods 37 are fixed at the end of the cylinder body 31 near the clamping sub-assembly 50, and pass through the positioning holes 513. The clamping sub-assembly 50 is fixed on an end of the piston member 35 at the same side as the tool holding pan 17. Fourth, the mounting members 531 are fixed to the cutter-changing arm 51 and received in the clamping holes 515. The elastic member 533 and the piston 535 are sleeved on the mounting member 531, and one of the two opposite ends of the elastic member 533 presses against the piston 535 and another one of the two opposite ends of the elastic member 533 presses against the mounting member 531. The resisting members 537 are movably mounted between the elastic member 533 and the mounting member 531.

In assembly, first, the cam indexer 13 is fixed on the base 11, and the tool holding pan 17 and the driving member 15 are mounted on the sidewalls of the cam indexer 13. Second, the piston member 35 is movably sleeved on the guiding member 33, and received in the receiving chamber 311. The guiding member 33 is fixed to the cylinder body 31. Third, the guiding rods 37 are fixed at the end of the cylinder body 31 near the clamping sub-assembly 50, and pass through the positioning holes 513. The clamping sub-assembly 50 is fixed on an end of the piston member 35 at the same side as the tool holding pan 17. Fourth, the mounting members 531 are fixed to the cutter-changing arm 51 and received in the clamping holes 515. The elastic member 533 and the piston 535 are sleeved on the mounting member 531, and the two opposite ends of the elastic member 533 press against the piston 535 and against the mounting member 531. The resisting members 537 are movably mounted between the elastic member 533 and the mounting member 531.

Figure 6:
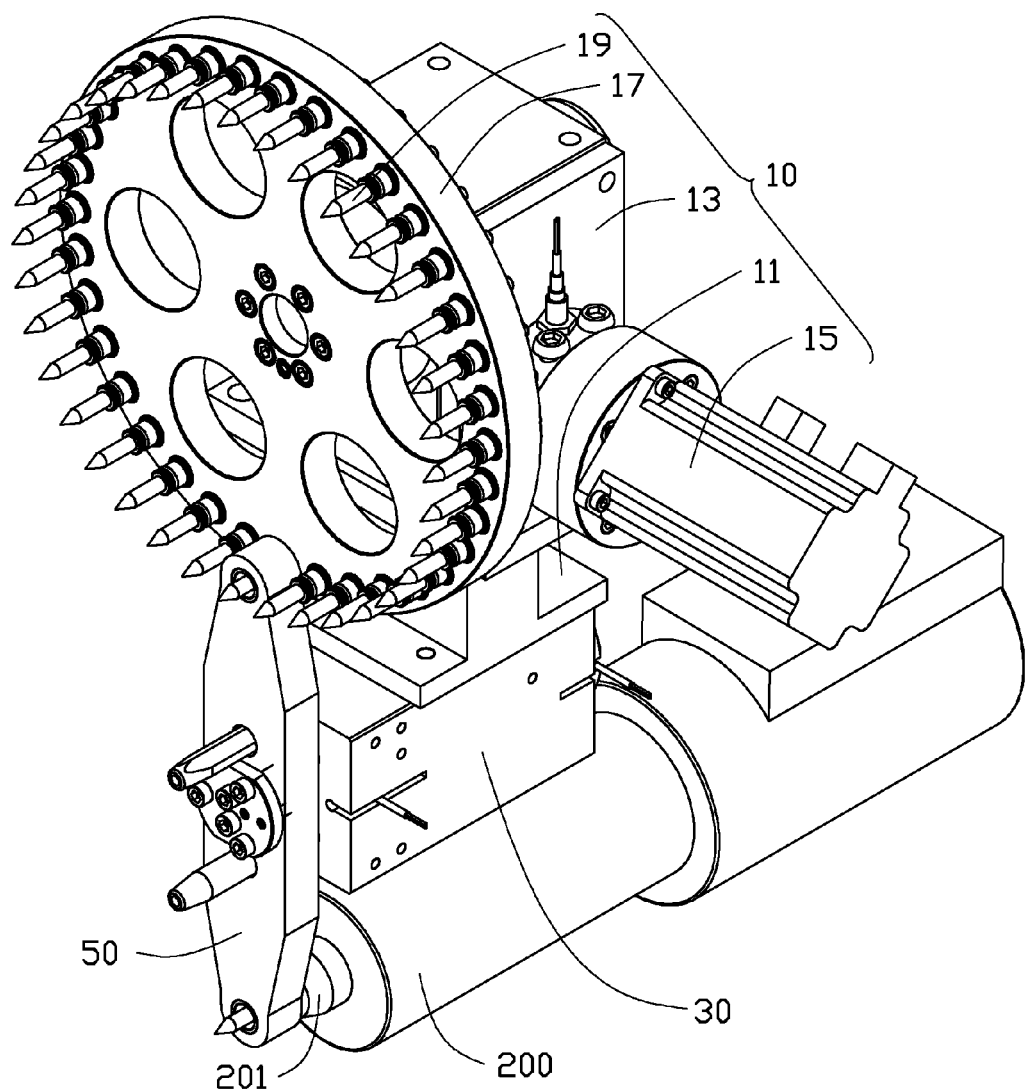
FIG. 6 is an isometric view of a working state of the cutter-changing device shown in FIG. 3.

Referring to FIG. 6, in use, the cutter-changing device 100 is positioned beside a spindle or chuck (spindle 200) of a machining device (not shown). The spindle 200 includes an engaging portion 201 to engage with a cutter 19. The cutter 19 at the engaging portion 201 and one cutter 19 at the tool holding pan 17 each passes through the clamping holes 515, respectively. The pistons 535 move towards the resisting members 537 by the force of compressed air, to make the resisting surfaces 5351 resist the resisting members 537, thus the resisting members 537 are partially exposed from the mounting holes 5311, and tightly grasp the sidewalls of each cutter 19 at the spindle 200 and at the tool holding pan 17.

Then, the piston member 35 slides along the sliding groove 331 towards the cutter-changing arm 51, to drive the clamping sub-assembly 50 away from the cylinder body 31, and the cutters 19 detach from the engaging portion 201 and the tool holding pan 17. The piston member 35 slides from one sliding groove 331 to another sliding groove 331 via the two rotating grooves 333 and one positioning groove 335, and the cutter-changing arm 51 rotates 180 degrees driven by the piston member 35 and the guiding rods 37. Thus the cutter 19 that was clamped from the engaging portion 201 is aligned with a mounting hole of the tool holding pan 17, and the cutter 19 that was clamped from the tool holding pan 17 is aligned with the engaging portion 201. Next, the piston member 35 slides along the sliding groove 331 away from the cutter-changing arm 51, to drive the clamping sub-assembly 50 towards the cylinder body 31, and the cutter 19 and the (substitute) cutter 19 engage with the engaging portion 201 and the tool holding pan 17, respectively. Finally, the clamping assemblies 53 release the cutter 19, and the piston member 35 slides along the sliding groove 331 to the positioning groove 335 via the rotating groove 333, and the cutter-changing arm 51 rotates 90 degrees to a resting position.

The piston 535 resists the resisting member 537 to clamp the cutters 19 by using the force from the compressed air. Even if gaps occur between the resisting member 537 and the piston 535 due to wear and rubbing each other after long usage, it can be compensated via the force of the compressed air for adjusting the clamping force, to ensure continuing clamping precision. The rotary telescopic cylinder 30 can be other cylinders in other embodiments, as different needs or requirements dictate.

It is believed that the present embodiments and their advantages will be understood from the foregoing description, and various changes may be made thereto without departing from the spirit and scope of the embodiments or sacrificing all of its material advantages.

What is claimed is:

1. A cutter-changing device, comprising:
   a cutter-magazine for carrying a plurality of cutters;
   a clamping sub-assembly comprising a cutter-changing arm, and a pair of clamping assemblies for clamping the cutters;
   a rotary telescopic cylinder driving the cutter-changing arm to rotate about a central axis thereof, extend away from the rotary telescopic cylinder and retract towards the rotary telescopic cylinder; the rotary telescopic cylinder comprising:
   a cylinder body defining a receiving chamber, a first through hole, and a second through hole at a sidewall of the cylinder body communicating with the receiving chamber, a guiding member received in the receiving chamber and fixed with the cylinder body, a piston member sleeved on the guiding member and fixed with the cutter-changing arm, and a pair of guiding rods mounted at an end of the cylinder body and connected with the cutter-changing arm, wherein the piston slides along the guiding member to drive the cutter-changing arm to rotate about the central axis, extend away from the rotary telescopic cylinder and retract towards the rotary telescopic cylinder, wherein each clamping assembly comprises a mounting member, an elastic member, a piston, and at least one resisting member; the mounting member is mounted on the cutter-changing arm, and defines at least one mounting hole through a sidewall of the mounting member corresponding to the at least one resisting member; the elastic member and the piston are sleeved with the mounting member, one of two opposite ends of the elastic member presses against the piston and another one of the two opposite ends of the elastic member presses the mounting member; the at least one resisting member is mounted between the elastic member and the mounting member, and capable of being resisted by the piston to be partially exposed from the at least one mounting hole.

2. The cutter-changing device of claim 1, wherein a pair of sliding grooves are defined in a sidewall of the guiding member; and the sliding grooves extend along an axis of the guiding member, to allow the piston member sliding along each of the sliding grooves to drive the cutter-changing arm to extend away from the rotary telescopic cylinder and retract towards the rotary telescopic cylinder.

3. The cutter-changing device of claim 2, wherein the guiding member further defines two pairs of rotating grooves, and a pair of positioning grooves at the sidewall of the guiding member; the two pairs of rotating grooves are formed along a circumference of the guiding member, and each rotating groove interconnects a positioning groove and a sliding groove; the piston member slides along the two pairs of rotating grooves to drive the cutter-changing arm to rotate about the central axis; the piston member is received in each positioning groove to position the cutter-changing arm.

4. The cutter-changing device of claim 1, wherein the cutter-changing arm defines a central fixing hole; and the piston member passes through the central fixing hole and fixes with the cutter-changing arm.

5. The cutter-changing device of claim 1, wherein the cutter-changing arm defines a pair of positioning holes corresponding to the pair of guiding rods; and the pair of guiding rods pass through the corresponding positioning holes.

6. The cutter-changing device of claim 1, wherein the cutter-changing arm defines a pair of clamping holes at opposite ends thereof, for receiving the corresponding clamping assemblies; a sidewall of each clamping hole defines a through hole connected with an air source; the clamping assemblies are mounted in the corresponding clamping holes, and the piston pushes the at least one resisting member to be partially exposed from the mounting hole when driven by air supplied by the air source.

7. The cutter-changing device of claim 6, wherein the piston forms a declined resisting surface near the at least one resisting member; the resisting surface resists the at least one resisting member to be partially exposed from the at least one mounting hole when driven by the air supplied by the air source.

8. The cutter-changing device of claim 1, wherein the at least one resisting member is a plurality of steel balls.

9. The cutter-changing device of claim 1, wherein the cutter-magazine comprises a base, a cam indexer, a driving member, and a tool holding pan; the cam indexer is mounted on the base; the driving member is mounted on the cam indexer; the tool holding pan is mounted on the cam indexer at a same side of the cam indexer with the cutter-changing arm.

10. A cutter-changing device, used for changing a plurality of cutters therein, comprising:
   a cutter-magazine carrying a plurality of cutters;
   a clamping sub-assembly comprising a cutter-changing arm, and a pair of clamping assemblies for clamping the cutters;
   a rotary telescopic cylinder driving the cutter-changing arm to rotate about a central axis thereof, extend away from the rotary telescopic cylinder and retract towards the rotary telescopic cylinder;
      wherein the rotary telescopic cylinder comprises a cylinder body, a guiding member, and a piston member; the cylinder body defines a receiving chamber, a first through hole and a second through hole communicating with the receiving chamber; the guiding member is received in the receiving chamber, and fixed with the cylinder body; the piston member is sleeved on the guiding member, and fixed with the cutter-changing arm; a pair of sliding grooves, a two pairs of rotating grooves, and a pair of positioning grooves are defined at a sidewall of the guiding member, the pair of sliding grooves extend along an axis of the guiding member, to allow the piston member sliding along each sliding groove to drive the cutter-changing arm to extend away from the rotary telescopic cylinder and retract towards the rotary telescopic cylinder, the two pairs of rotating grooves are depressed along a circumference of the guiding member, and each rotating groove interconnects a positioning groove and a sliding groove; the piston member slides along the two pairs of rotating grooves to drive the cutter-changing arm to rotate about the central axis; the piston member is received in each positioning groove to position the cutter-changing arm.

11. The cutter-changing device of claim 10, wherein each clamping assembly comprises a mounting member, an elastic member, a piston, and at least one resisting member; the mounting member is mounted on the cutter-changing arm, and defines at least one mounting hole through a sidewall of the mounting member corresponding to the at least one resisting member; the elastic member and the piston are sleeved with the mounting member, one of two opposite ends of the elastic member presses against the piston and another one of the two opposite ends of the elastic member presses the mounting member; the at least one resisting member is mounted between the elastic member and the mounting member, and capable of being resisted by the piston to be partially exposed from the at least one mounting hole.

12. The cutter-changing device of claim 11, wherein the cutter-changing arm defines a central fixing hole; the piston member passes through the central fixing hole and fixes with the cutter-changing arm.

13. The cutter-changing device of claim 11, wherein the at least one resisting member is a plurality of steel balls.

14. The cutter-changing device of claim 10, wherein the rotary telescopic cylinder further comprises a pair of guiding rods mounted at an end of the cylinder body; the cutter-changing arm defines a pair of positioning holes corresponding to the pair of guiding rods; the pair of guiding rods pass through the corresponding positioning holes.

15. The cutter-changing device of claim 14, wherein the cutter-changing arm defines a pair of clamping holes at opposite ends thereof, for receiving the corresponding clamping assemblies; a sidewall of each clamping hole defines a through hole connected with an air source; the clamping assemblies are mounted in the corresponding clamping holes, and the piston pushes the at least one resisting member to be partially exposed from the at least one mounting hole when driven by air supplied by the air source.

16. The cutter-changing device of claim 15, wherein the piston forms a declined resisting surface near the at least one resisting member; the resisting surface resists the resisting member to be partially exposed from the at least one mounting hole when driven by air supplied by the air source.

17. The cutter-changing device of claim 10, wherein the cutter-magazine comprises a base, a cam indexer, a driving member, and a tool holding pan; the cam indexer is mounted on the base; the driving member is mounted on the cam indexer; the tool holding pan is mounted on the cam indexer at a same side of the cam indexer with the cutter-changing arm.

18. A cutter-changing device, comprising:
a cutter-magazine for carrying a plurality of cutters;
a clamping sub-assembly comprising a cutter-changing arm, and a pair of clamping assemblies for clamping the cutters;
a rotary telescopic cylinder comprising:
    a cylinder body defining a receiving chamber, a first through hole, and a second through hole at a sidewall of the cylinder body communicating with the receiving chamber,
    a guiding member received in the receiving chamber and fixed with the cylinder body,
    a piston member sleeved on the guiding member and fixed with the cutter-changing arm, and
    a pair of guiding rods mounted at an end of the cylinder body, and are connected with the cutter-changing arm,
wherein the piston slides along the guiding member to drive the cutter-changing arm to rotate about a central axis thereof, extend away from the rotary telescopic cylinder and retract towards the rotary telescopic cylinder.

* * * * *